US005940645A

United States Patent [19]
Bonin

[11] Patent Number: 5,940,645
[45] Date of Patent: Aug. 17, 1999

[54] CAMERA CRANE WITH PAN/TILT HEAD

[76] Inventor: Steve G. Bonin, 7319 Tallowtree La., Orlando, Fla. 32835

[21] Appl. No.: 08/955,894

[22] Filed: Oct. 22, 1997

[51] Int. Cl.$^6$ .................................................. G03B 17/00
[52] U.S. Cl. .......................................... 396/428; 352/243
[58] Field of Search .................................... 396/419, 428; 352/243

[56] References Cited

U.S. PATENT DOCUMENTS 2,599,269  6/1952  Markle .............................. 396/428 X

*Primary Examiner*—Howard B. Blankenship
*Attorney, Agent, or Firm*—Domingue, Delaune & Waddell

[57] ABSTRACT

A device for controlling the movement of a camera by an operator is disclosed. In one embodiment, the device comprises camera crane member that mounts the camera. The camera crane member will have a first end containing a camera platform. Also included will be the pan and tilt head member, operatively attached to the camera platform, that is adapted for panning and tilting the camera. The device further includes an upper arm plate extending from the pan/tilt head member, with the upper arm plate adapted to mount the camera. The device also contains a first rod and a second rod that extends from the camera crane, and a swivel component, operatively attached to the second end of the first rod of the mounting rod, for swiveling the second rod. The device will also contain a vertical arm that is attached to the upper arm plate that extends vertically downward. A handle member may be formed on the second end of the second rod, the handle being disposed so that the operator may grasp the handle in the forward direction.

15 Claims, 8 Drawing Sheets

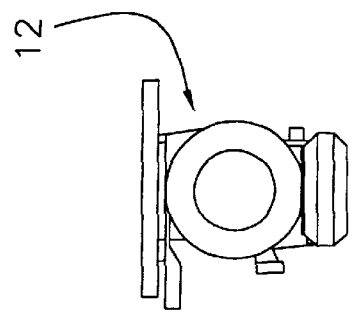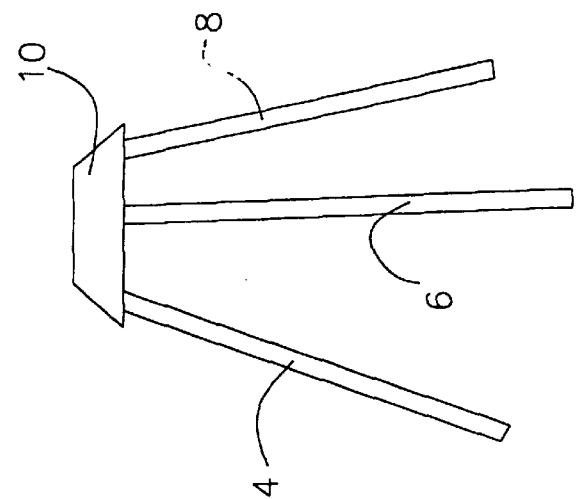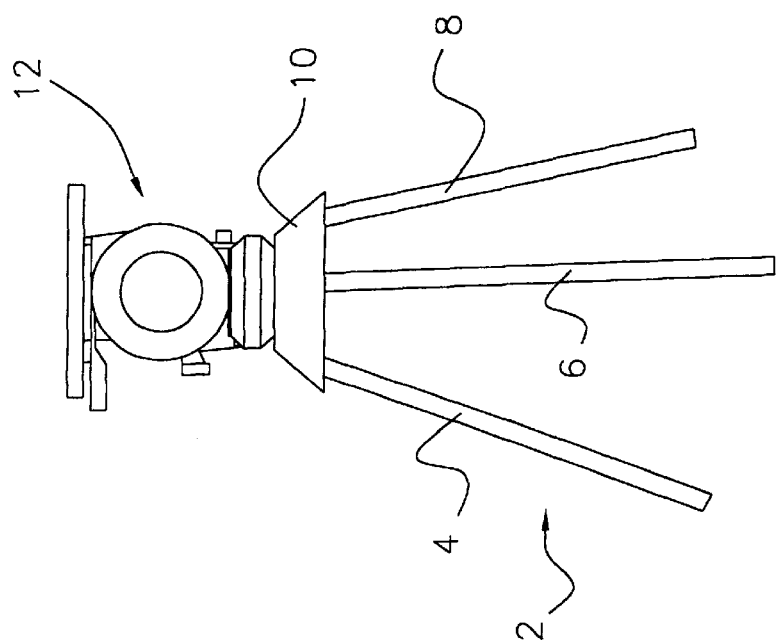
FIGURE 1A
PRIOR ART
FIGURE 1B
PRIOR ART

CAMERA CRANE WITH PAN/TILT HEAD

BACKGROUND OF THE INVENTION

This invention relates to an apparatus used with a camera, camera crane and tripod. More particularly, but not by way of limitation, this invention relates to a device that is used by an operator in conjunction with a camera, camera crane, tripod and pan/tilt head to control the pan and tilt of the camera through the entire range of the crane's movement.

In the entertainment and movie industry, camera operator's are constantly striving for obtaining angles and views that will complement a scene. In their efforts to obtain better shots, the industry has developed a camera crane which has disposed thereon a camera. The camera crane can be used to properly elevate and position the camera and produce smooth floating images. The camera crane will also contain the pan/tilt head which is a device that can be used to pivot, tilt, and rotate the camera in a multitude of positions.

Despite these innovations, camera operators and producers are limited to the control of pan/tilt head, and therefore, the camera lens due to height and space limitations. Moreover, the entire range and panoramic view is limited by the prior art camera cranes. These, and other problems, are solved by the invention herein described and claimed as will be more fully set out.

SUMMARY OF THE INVENTION

A device for controlling the movement of a camera by an operator is disclosed. In one embodiment, the device comprises camera crane means for mounting the camera. The camera crane means will have a first end and a second end with the first end containing a camera platform. Also included will be the pan and tilt head means, operatively attached to the camera platform, for panning and tilting the camera. The pan and tilt head means allows the camera to be placed in a multitude of positions. The device further includes an upper arm plate extending from the pan/tilt head means, with the upper arm plate adapted to mount the camera. The camera will be mounted in a first direction. The device also contains control means, operatively associated with the camera crane means, for controlling the pan/tilt head means.

The control means will comprise a first rod that extends from the camera crane means, the first rod having a first end and a second end, with the first end being attached to the camera crane means. The control means further includes a second rod containing a first end and a second end, with the first end being attached to the bracket mechanism, and a swivel and pivot means, operatively attached to the second end of the first rod of the mounting rod, for swiveling and pivoting the second rod, and wherein the first rod and the second rod extend horizontally relative to the upper arm plate. The control means will also contain a vertical arm having a first end and a second end, the first end being attached to the upper arm plate and extending vertically downward, and the second end being attached to the second end of the second rod so that the vertical arm and the second rod form a pivot point as well as an essentially 90 degree angle when the camera and upper arm plate are horizontal with the ground level. A handle member may be formed on the second end of the second rod, the handle being disposed so that the operator may grasp the handle in the forward direction.

According to the teachings of the present invention, the swivel means may comprise a conical member having a first end and a second end; a first swivel/connection point positioned on the first rod which allows for a radial movement of the second rod with respect to the first rod; and, a second swivel/connection point positioned on the second rod which allows for a longitudinal movement of the second rod with respect to the first rod.

In the preferred embodiment, the first swivel/connection point, the second swivel/connection point and the pan/tilt head means form a line. Also, the line and the vertical arm are parallel to each other in a range of motion of the first swivel/connection point, and the mounting rod is parallel to the upper horizontal arm in a range of motion of the second swivel/connection point. In the preferred embodiment, the camera mounts on the upper arm plate such that a camera lens points in the forward direction relative to the camera crane means, and wherein the handle is disposed in the equivalent forward direction.

An advantage of the present invention includes the ability to operate the device in conjunction with a camera crane and multiple pan/tilt head systems. Another advantage is that the operator can control the pan and tilt of the camera through the entire range of the crane's movement, even with the camera four feet above the operator's head. Still yet another advantage is that the operator can control the camera while standing, and during this process, not interfering with the view of the camera. Another advantage is that the operator may control the pan and tilt of the camera as the crane lifts the camera up and down.

Yet another advantage is that the invention may be included as an accessory to the camera crane. Also, the pan/tilt head may still come equipped with a brake system so that the pan/tilt head may be locked into infinite camera angles for still shooting. Still yet another advantage is that the camera crane can still be utilized in its traditional configuration with the novel pan/tilt controller herein disclosed.

Another advantage of the present invention includes the ability of the operator to control the pan and tilt of the camera through the entire range of the crane's movement, even with the camera four and a half feet above the operator's head. Also, the invention may be used to adjust the camera for still shots when the crane is not moving the camera. Yet another advantage is the invention does not need to be removed for the crane to operate in its traditional configuration.

A feature of the present device includes that it is purely mechanical, using the pan and tilt friction and fluid motion of the head to accommodate the operator's shooting style. Another feature is that the invention herein claimed is not like other remote control devices in that there are no servo motors or joy-sticks for the operator to control. Still yet another feature is the mounting rod and upper horizontal arm are parallel relative to each other, while the vertical arm and the plane that divides the pan/tilt head and the swivel mechanism forms a parallelogram. The device effectively remains in this parallelogram arrangement through the entire range of motion. Still yet another feature is that the invention is purely mechanical, using the drag and fluid motion of the pan/tilt head to accommodate the operator's shooting style.

BRIEF DESCRIPTION OF THE DRAWINGS

FIG. 1A is a schematic view of a prior art tripod with a pan/tilt head device.

FIG. 1B is a schematic view of the prior art tripod and pan/tilt head device as separate components.

DETAILED DESCRIPTION OF THE PREFERRED EMBODIMENTS

Referring now to FIG. 1, is a schematic view of a prior art tripod 2 will now be described. The tripod 2 will consist of a base structure containing three legs 4, 6, 8 that meet at the platform top 10. The tripod 2 will have disposed on the platform top 10 the pan/tilt head 12. The pan/tilt head 12 is commercially available from Bogen Company under the mark #510. The tripod 2 can be separated into two components, the tripod legs and the pan/tilt head. In FIG. 1B, the tripod components of the legs 4, 6, 8 as well as the pan/tilt head 12 are depicted. As shown, the pan/tilt head 12 is detachably mounted to the platform top 10.

Figure 2:
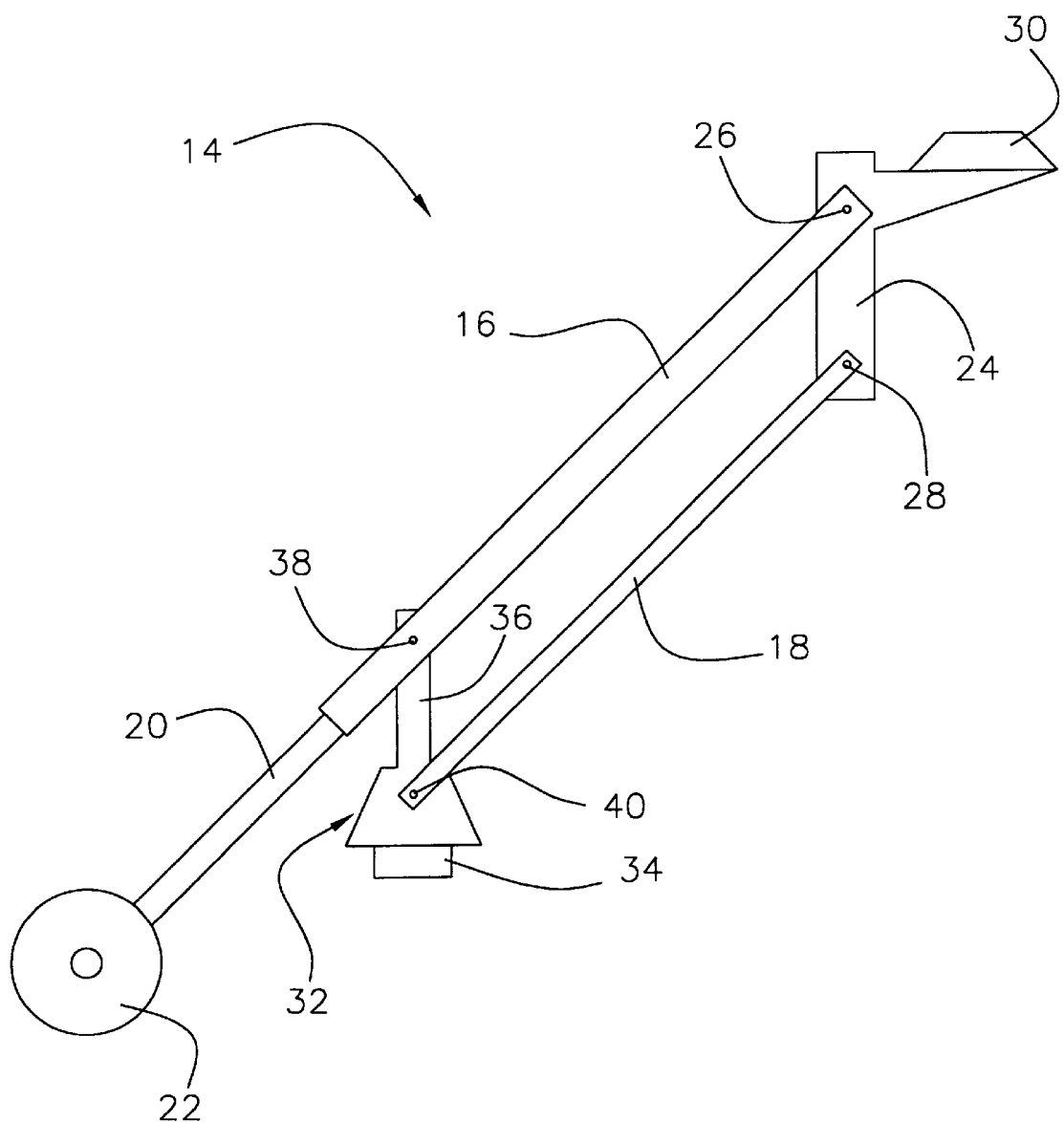
FIG. 2 is a schematic view of the prior art camera crane.

With reference to FIG. 2, a schematic view of the prior art camera crane 14 will now be described. The camera crane 14 mounts to platform top 10 and is supported by the tripod legs 4, 6, 8. The camera crane 14 will include an upper crane arm 16 and a lower crane arm 18. As shown, the upper crane arm 16 and the lower crane arm 18 are generally parallel. The upper crane arm 16 will have extending therefrom the tail arm 20, with the tail arm 20 containing the counter weights 22. At the other end, the camera crane 14 will contain the camera platform 24. As shown in FIG. 2, the camera platform 24 will have the upper crane arm 16 attached thereto at connection-pivot point 26 as well as having the lower crane arm 18 attached thereto at connection-pivot point 28. The pan/tilt head 12 would then be mounted on the base 30.

The camera crane of FIG. 2 will also contain a swivel base member (also known as center post) 32. As seen, the swivel base member 32 contains a lower portion swivel base receptacle 34 that will cooperate with and mount with the platform 10 of the tripod 2. The swivel base member 32 also contains extension 36. The upper crane arm 16 is pivotly attached at connection-pivot point 38 while the lower crane arm 18 is pivotly attached at connection-pivot point 40. The camera crane can be used to properly elevate and rotate the position of the camera and produce floating images.

As those of ordinary skill in the art appreciate, the pan/tilt head 12, which is used to pivot, tilt and rotate the camera into a multitude of positions, mounts to the camera crane 14. The camera the mounts to the pan/tilt head 12 via a quick release plate that allows the camera to easily connect and disconnect from the pan/tilt head 12. The camera crane 14 is designed so that the camer platform to which the pan/tilt head and camera are mounted remains level as the crane elevates the camera.

Figure 3:
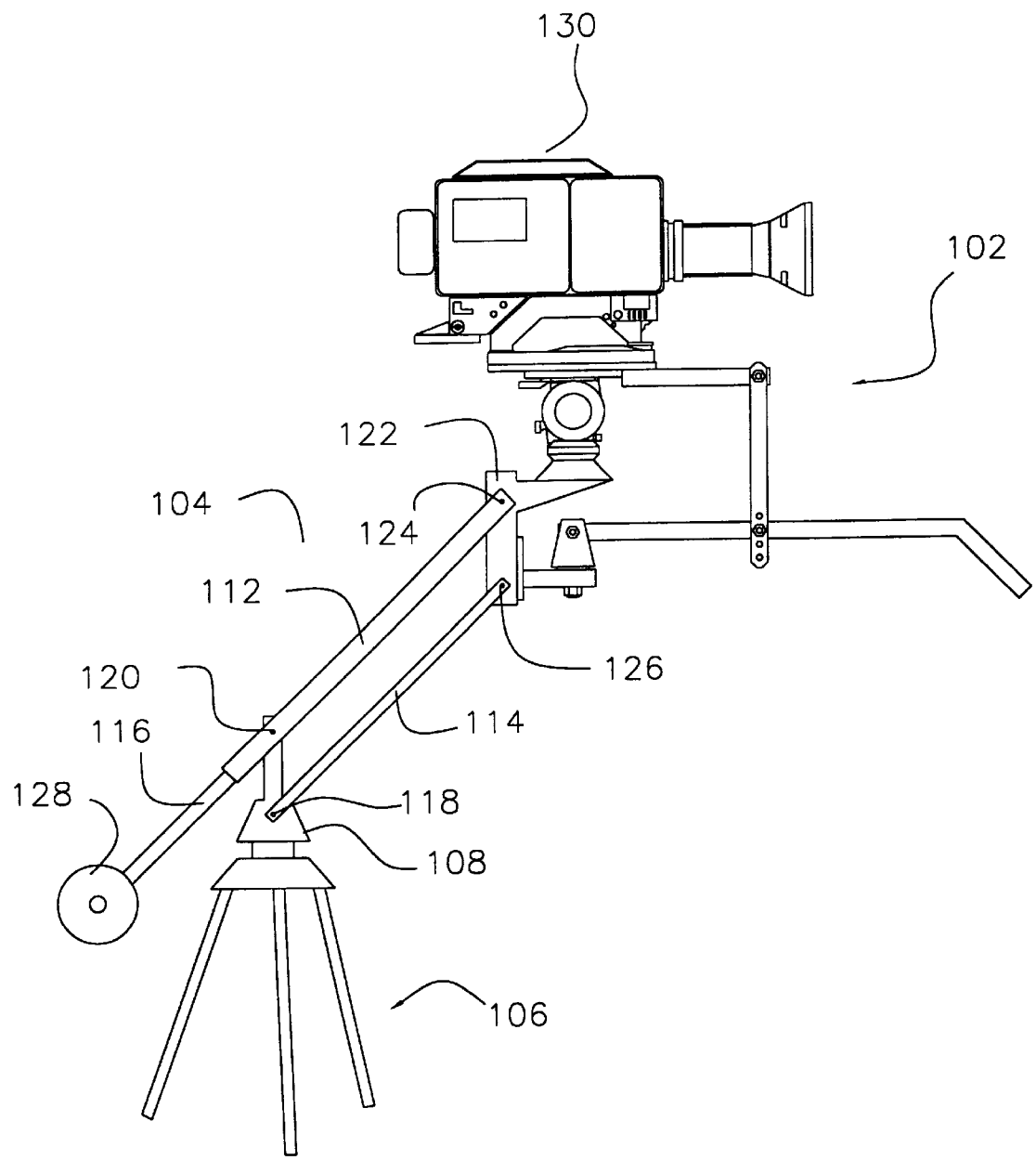
FIG. 3 is a schematic view of the present invention for pan/tilt control of a camera.

Referring now to FIG. 3, the present invention, which includes the apparatus 102 mounted on the camera crane 104, will now be described. The apparatus 102 is used by an operator to control the pan and tilt of the camera as the crane lifts the camera up and down. The camera crane 104 mounts on the tri-pod 106. The tri-pod 106 will be connected to the camera crane 104 via the swivel receptacle base 108 (also referred to as the center post 108), with the swivel receptacle base 108 being connected to the arm members. This type of camera crane means 104 is similar to the camera crane means described in FIG. 2 and is commercially available from the JNS Company under the mark "EZ FX". The tri-pod base 106 is commercially available from the Bogan Company under the mark #3191.

As seen in FIG. 3, the arm members consist of a first upper arm segment 112 and a second lower arm segment 114 as well as a counter weight segment (tail arm) 116. The first arm segment 112 is attached to the swivel receptacle base 108 at pivot-connection point 118 and the second a segment 114 is attached to the receptacle 108 at pivot point 120. The first arm segment 112 extends to the camera platform brace 122 with the first segment 112 being attached to the pivot-connection point 124. The second arm segment 14 also extends to the camera platform brace 122 with the second arm segment 114 being attached to the pivot-connection point 126. The counter weight arm segment 116 extends generally from the first arm segment 112 and will contain counter-weights 128.

The camera platform brace 122 will mount the camera 130 as will be more fully described with reference to FIG. 4. In operation of the camera crane means 104, as those of ordinary skill in the art will appreciate, the operator may raise or lower the camera 130 which will be allowed by the movement of the first arm segment 112 and second arm segment 114 about the pivot-connection points 118, 120, 124, and 126. Note that the receptacle 108 and camera platform brace 122 are essentially parallel and that first arm segment 112 and second arm segment 114 are essentially parallel so that a parallelogram is basically formed. Moreover, the camera 130 may be freely turned due to the radial rotation allowed by the swivel receptacle base 108. The camera crane 104 allows the operator to elevate, lower, and rotate the camera in a multitude of positions.

Figure 4:
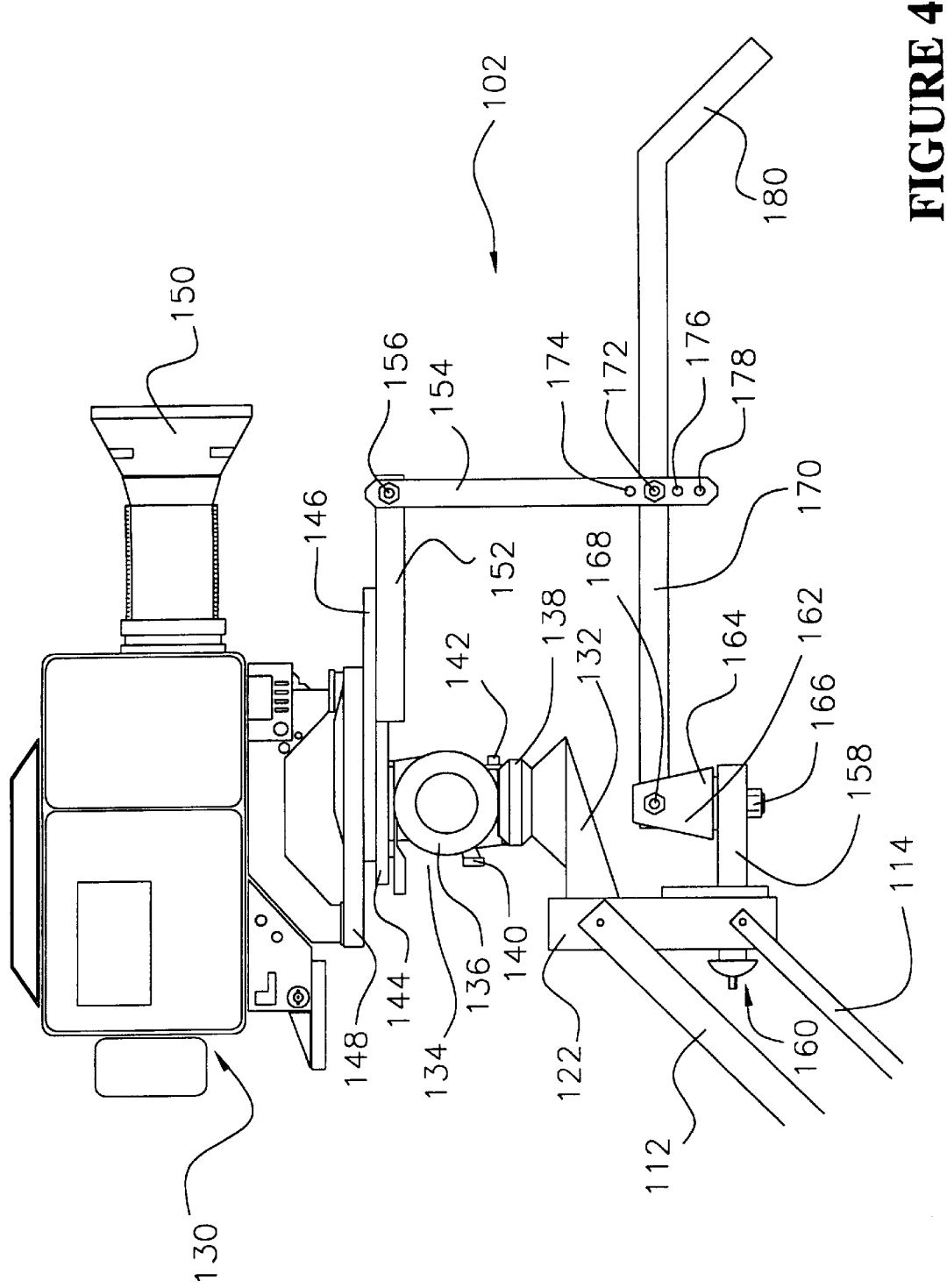
FIG. 4 is a schematic view of the preferred embodiment of the present invention.

Referring now to FIG. 4, the preferred embodiment of the apparatus 102 will now be described. As depicted, the camera platform brace 122 will have extending therefrom a crane mount stand 132. The stand 132 will support the pan/tilt head means 134 for panning and tilting the camera in a multitude of positions. The pan/tilt head means 134 allows rotation of the camera in a vertical (up and down) motion through the ball 136 while also allowing rotation of the camera in a radial (circular) motion through the dial 138. Also included may be locking mechanisms 140 142 that may be used to lock the ball and/or dial in place during a shoot if so desired by the operator.

The pan/tilt head means 134 will extend to a connection plate 144 (also referred to as a quick release plate). The connection plate 144 will attach to the upper arm plate 146. The upper arm plate 46 connects to the pan/tilt head 134 and is adapted to mount the camera 130. The camera 13 will have a camera mounting plate 148 that is formed on the underside of said camera 130. As sown in FIG. 4, the camera lens 150 is disposed in a first direction. The upper arm plate 146 will have operatively attached thereto the upper horizontal arm 152. It should be noted that the connection plate 144, upper arm plate 146, mounting plate 148 and horizontal arm 152 may all be attached via conventional means such as nut and bolt means for engaging the components.

Extending downward from the upper horizontal arm 152 will be the vertical arm 154. The arm 154 is pivotly connected to the upper horizontal arm 152 at the connection point 156. In the preferred embodiment, the vertical arm 154 consist of a first rod and a second rod. This aspect of the invention will be discussed in the description of FIG. 7.

Returning to FIG. 4, the camera platform brace 122 will also have extending therefrom a first section 158 of the mounting rod. As depicted in FIG. 4, the first section 158 is attached to the camera platform brace 122 by conventional means such as a mounting knob 160, which may be a threaded shaft and knob. The first section 158 will have attached thereto a swivel/pivot mechanism 162. The swivel mechanism 162 is generally a conical member that will have a base end 164 that will be connected to the first section 158 so that the swivel mechanism 162 can rotate in a radial plane. The swivel mechanism 162 is connected to the first section 58 at the connection point 166 with the connection point 166 being a nut and bolt arrangement extending through the first section 158. Towards the upper end of the swivel mechanism 162 there will be another connection point 168. The connection point 168 will have extending therefrom the second rod section 170. Note that first section 158 and the crane mount stand 132 are fixed and extend essentially perpendicular from the camera platform brace 122.

As depicted in FIG. 4, the second section 170 will be connected to the swivel mechanism 162 so that the second section 170 may move in a longitudinal motion. The second section 170 will also be connected to the vertical arm 154 at the connection point 172. The vertical arm 172 may have other apertures 174, 176, 178 for placement of the connection point 172 therein if so desired by the operator. The optional mounting holes 174, 176, 178 are selected to accommodate a specific application. The specific connection point chosen will effect the angle the operator will use to direct the camera 130. The holes also allow the apparatus to accommodate different size pan/tilt heads as to keep the upper horizontal and the lower horizontal arms parallel. The second rod section 170 advances to the handle member 180 that may be grasped by the operator in a forward direction as will be fully explained later in the application.

Figure 5:
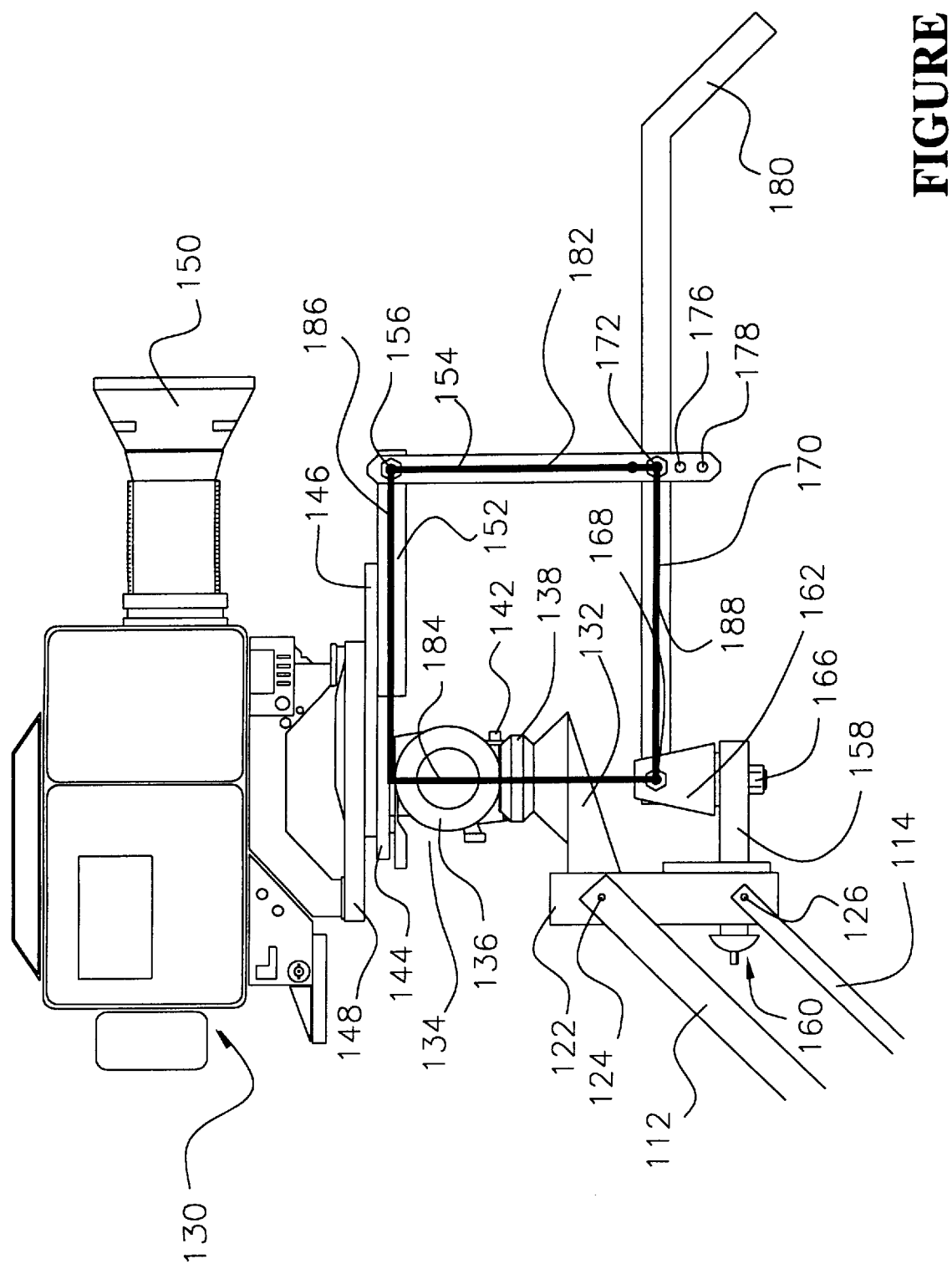
FIG. 5 is the embodiment of FIG. 4 depicting the four sided plane arrangement of the novel apparatus.

Referring now to FIG. 5, the embodiment of FIG. 4 that depicts the four sided plane arrangement of the novel apparatus will now be described. It should be noted that like numbers appearing in the various figures refer to like components. In the preferred embodiment, the planar arrangement basically forms a parallelogram of the four sides. Thus, a first plane is formed by the vertical arm(s) 154 (the first plane represented in FIG. 5 by the bold line 182) and a second plane formed from the center line of the pan/tilt head 134 through the center line of the swivel mechanism 162 (the second plane represented in FIG. 5 by the bold line 184). As shown, the planes 182 and 184 are essentially parallel. A third plane is formed by the upper horizontal arm (the third plane represented by the bold line 186) and a fourth plane is formed by the second rod section 171 (the fourth plane represented by the bold line 188).

Thus, as the operator would move the handle 180 in a downward fashion, the second rod section 170 would also move downward. Due to the novel design, the second rod section 170 would be essentially parallel with the upper horizontal arm 186 i.e. the bold line 188 is essentially parallel with the bold line 186. In this downward movement, the bold line 184 is also generally parallel with the bold line 182. This is possible through the movement of the arm 152, arm 154, and rod section 170 about the connection points 168, 172, 156.

The same would hold true with an upward movement of the handle 180. Thus, second rod section 170 would be inclined upward. Due to the novel design, the second rod section 170 would be essentially parallel with the upper horizontal arm 152 i.e. the bold line 188 is essentially parallel with the bold line 186. In this upward movement, the bold line 184 is also generally parallel with the bold line 182. This is possible through the movement of the arm 152, arm 154, and rod section 170 about the connection points 168, 172, 156.

Also in accordance with the teachings of the present invention, the operator may move the handle 180 laterally relative to the camera platform brace 122 i.e. the operator may pan the camera. The swivel mechanism 162 will allow for the rotation via the connection point 166, which rotative force is applied to the pan/tilt head means 134 via the upper horizontal arm. Of course, the operator may also move the camera handle up or down, and also pan the camera laterally back and forth for the specific angle and effect desired by the operator. Please note that in the embodiment disclosed, the view of camera lens 150 is not obstructed by the handle 180 during the movement of apparatus 102.

Figure 6:
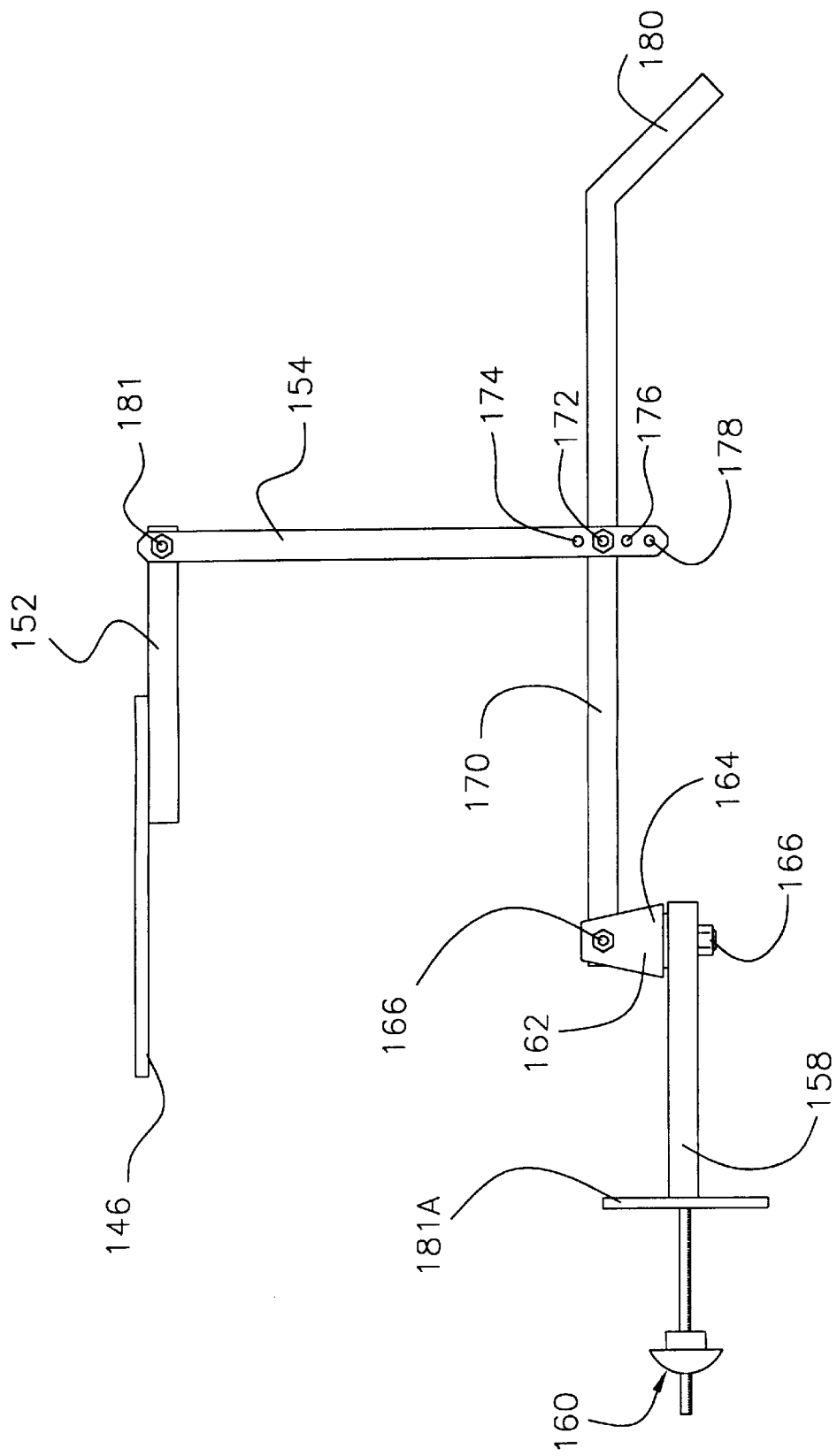
FIG. 6 is a schematic view of the control means of the present invention.

Referring now to FIG. 6, a schematic view of the control means of the present invention is depicted detached from the camera platform brace 122, camera mounting plate 148 and camera 130. Thus the upper arm plate 146 is connected to the upper horizontal arm 152, with the vertical arm(s) 154 extending vertically therefrom. The upper horizontal arm 152 is pivotly attached to the vertical arm(s) 154 via conventional means such as a nut and bolt arrangement 181.

Further, FIG. 6 depicts the first section 158 that also extends from the camera platform brace 12 along with the mounting knob 160. Also seen is the washer 181A that may be used to help in tightening the first section 158 into place with the brace 122. In the preferred embodiment, the washer 181A may be welded to the rod 158 and the threaded shaft may be is permanently attached to 181A and 158; the knob is removable. As described earlier, the swivel mechanism 162 is operatively attached with the first section 158. In turn, the second rod section 170 stretches from the pivot-connection point 166, with the connection point 172 pivotly connecting the lower horizontal rod 170 with the vertical arm(s) 154.

Figure 7:
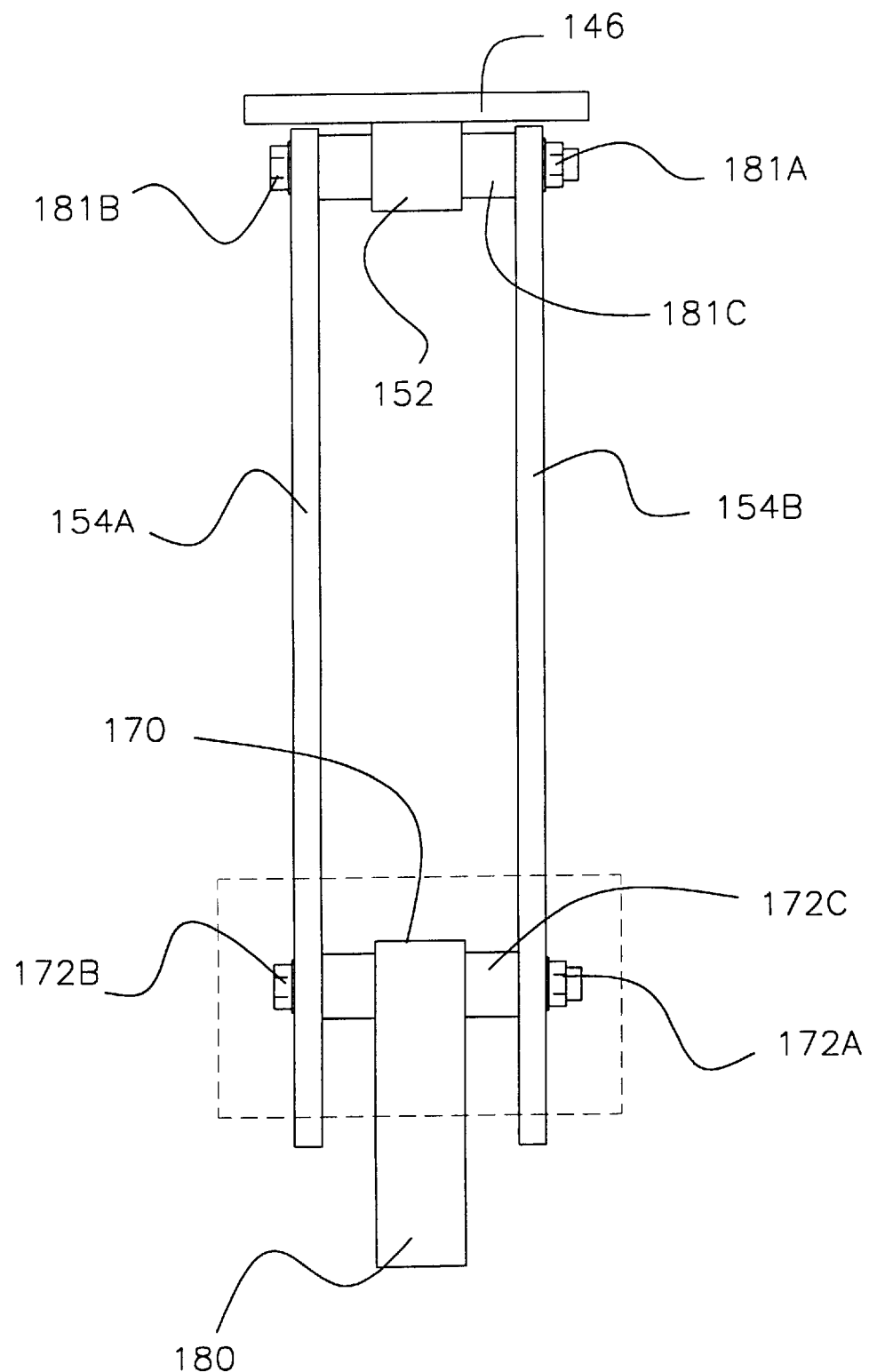
FIG. 7 is a front view of the control means illustrated in FIG. 6.

Referring now to FIG. 7, a front view of the preferred embodiment of the control means illustrated in FIG. 6 will now be described. As noted earlier, the upper arm plate 146 and the upper horizontal arm 152 are connected. Extending through the horizontal arm 152 and the vertical arms 154A and 154B is the nut 181A and bolt 181B arrangement 181. A nylon spacer member 181C is also provided. The nylon washers and bushing allow the vertical arms to form smooth pivoting connections to the upper and lower horizontal arms.

Figure 8:
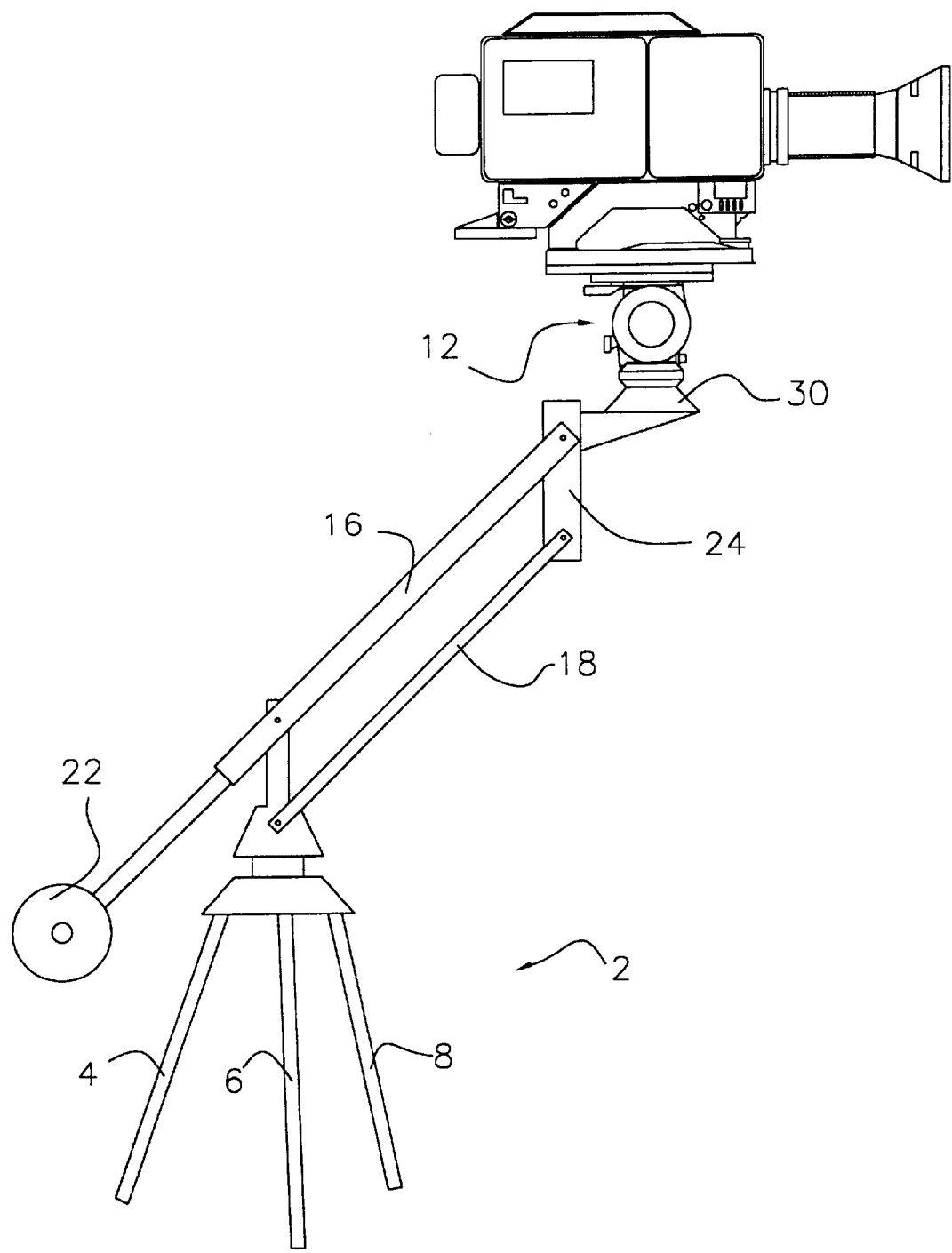
FIG. 8 is a schematic presentation of the prior art tripod and camera crane with mounted camera.

The vertical arm 154A extends on one end and the vertical arm 154B extends on the other side as shown. The vertical arms 154A and 154B are connected on one end at the connection point 181 and at the second end at the connection point 172. The connection point 172 includes a nut 172A and bolt 172B arrangement. A nylon spacer 172C is also included. The double vertical arms 154A and 154B provide stability and structural reinforcement. The vertical arms 154A, 154B tie the upper arm 152 to the lower arm 170 and force the upper arm 152 to follow the same movements as the lower arm 170. It should also be noted that a prior art crane 14, tripod 2 and mounted camera have been illustrated with reference to FIG. 8.

Changes and modifications in the specifically described embodiments can be carried out without departing from the scope of the invention which is intended to be limited only by the scope of the appended claims.

I claim:

1. An apparatus for positioning a camera comprising:
   camera crane means for mounting the camera, said camera crane means having a first end and a second end and wherein said first end contains a camera platform;
   a pan/tilt head means, operatively attached to said camera platform, for panning and tilting the camera in a multitude of positions;
   an upper arm plate extending from said pan/tilt head means adapted to mount said camera;
   a mounting rod extending from said camera platform;
   an upper horizontal arm extending from said upper arm plate;
   a vertical arm extending vertically from said mounting rod, said vertical arm being connected to said mounting rod having a first connection point being pivoted with said mounting rod.

2. The apparatus of claim 1 wherein said vertical arm is connected to said upper horizontal arm at a second connection point.

3. The apparatus of claim 2 wherein said mounting rod comprises:
   a first rod that extends from said camera crane means, said rod having a first end and a second end, with said first end being attached to said camera crane means;
   a second rod containing a first end and a second end, with said first end being attached to said second end of said first rod;
   swivel means, operatively attached to said second end of said first rod of said mounting rod, for swiveling said second rod.

4. The apparatus of claim 3 wherein said swivel means comprises:
   a conical member having a first end and a second end;
   a first swivel/connection point positioned on said first rod which allows for a radial movement of said second rod with respect to said first rod;
   a second swivel/connection point positioned on said second rod which allows for a longitudinal movement of said second rod with respect to said first rod.

5. The apparatus of claim 4 wherein said first swivel/connection point, said second swivel/connection point and said pan/tilt head means form a line, and wherein said line and said vertical arm are parallel in a range of motion of said first swivel/connection point, and wherein said mounting rod is parallel to said upper horizontal arm in a range of motion of said second swivel/connection point.

6. The apparatus of claim 5 further comprising:
   a handle member formed on said second end of said second rod.

7. An apparatus for controlling the movement of a camera by an operator, the apparatus comprising:
   camera crane means for mounting the camera, said camera crane means having a first end and a second end and wherein said first end contains a camera platform;
   a pan/tilt head means, operatively attached to said camera platform, for panning and tilting the camera;
   an upper arm plate extending from said pan/tilt head means;
   a first rod that extends from said camera crane means, said rod having a first end and a second end, with said first end being attached to said camera crane means;
   a second rod containing a first end and a second end, with said first end being attached to said second end of said first rod;
   swivel means, operatively attached to said second end of said first rod of said mounting rod, for swiveling said second rod, and wherein said first rod and said second rod extend horizontally relative to said upper arm plate.

8. The apparatus of claim 7 further comprising:
   a vertical arm having a first end and a second end, said first end being attached to said upper arm plate and extending vertically downward, and said second end being attached to said second end of said second rod so that said vertical arm and said second rod form a pivot point.

9. The apparatus of claim 8 wherein said swivel means comprises:
   a conical member having a first end and a second end;
   a first swivel/connection point positioned on said first rod which allows for a radial movement of said second rod with respect to said first rod;
   a second swivel/connection point positioned on said second rod which allows for a longitudinal movement of said second rod with respect to said first rod.

10. The apparatus of claim 9 wherein said first swivel/connection point, said second swivel/connection point and said pan/tilt head means form a line, and wherein said line and said vertical arm are parallel in a range of motion of said first swivel/connection point, and wherein said mounting rod is parallel to said upper horizontal in a range of motion of said second swivel/connection point.

11. The apparatus of claim 10 further comprising:
    a handle member formed on said second end of said second rod.

12. A device comprising:
    camera crane means for mounting a camera, said camera crane means having a first end and a second end and wherein said first end contains a camera platform;
    a pan/tilt head device, operatively attached to said camera platform and adapted to pan and tilt the camera in a multitude of positions;
    an upper arm plate extending from said pan/tilt head device adapted to mount said camera, said camera being mounted in a first direction;
    control means, operatively associated with said camera crane means for controlling said pan/tilt head device;
    a first rod extends from said camera crane means, said rod having a first end and a second end, with said first end being attached to said camera crane means;
    a second rod containing a first end and a second end, with said first end being attached to said second end of said first rod;
    swivel means, operatively attached to said second end of said first rod, for swiveling said second rod, and wherein said first rod and said second rod extend horizontally relative to said upper arm plate;
    a vertical arm having a first end and a second end, said first end being attached to said upper arm plate and extending vertically downward, and said second end being attached to said second end of said second rod so that said vertical arm and said second rod form a pivot point; and,
    a handle member formed on said second end of said second rod.

13. The device of claim 12 wherein said swivel means comprises:
    a conical member having a first end and a second end;

a first swivel/connection point positioned on said first rod which allows for a radial movement of said second rod with respect to said first rod;

a second swivel/connection point positioned on said second rod which allows for a longitudinal movement of said second rod with respect to said first rod.

14. The device of claim 13 wherein said first swivel/connection point, said second swivel connection point and said pan/tilt head means form a line, and wherein said line and said vertical arm are parallel in a range of motion of said first swivel/connection point, and wherein said second rod is parallel to an upper horizontal plane in a range of motion of said second swivel/connection point.

15. The device of claim 14 wherein said camera mounts on said upper arm plate such that a camera lens points in a forward direction relative to said camera crane means, and wherein said handle is disposed in the equivalent forward direction.

* * * * *